United States Patent
Saily et al.

(10) Patent No.: US 7,885,318 B2
(45) Date of Patent: Feb. 8, 2011

(54) METHOD, DEVICE, SYSTEM AND SOFTWARE PRODUCT FOR SOFT VALUE SCALING WITH RECEIVERS IN AN UNSYNCHRONIZED NETWORK

(75) Inventors: Mikko Saily, Sipoo (FI); Olli Piirainen, Oulu (FI); Kari Niemela, Oulu (FI); Jari Hulkkonen, Oulu (FI)

(73) Assignee: Nokia Corporation, Espoo (FI)

( * ) Notice: Subject to any disclaimer, the term of this patent is extended or adjusted under 35 U.S.C. 154(b) by 813 days.

(21) Appl. No.: 11/897,962

(22) Filed: Aug. 31, 2007

(65) Prior Publication Data

US 2008/0064337 A1 Mar. 13, 2008

Related U.S. Application Data (60) Provisional application No. 60/842,088, filed on Sep. 1, 2006.

(51) Int. Cl.
*H04B 1/00* (2006.01)

(52) U.S. Cl. .............. 375/148; 375/285; 375/346; 455/501; 455/63.1; 455/67.13; 455/226.2; 370/317; 370/320; 370/465

(58) Field of Classification Search ............. 375/141, 375/144, 147, 148, 267, 285, 340, 341, 346, 375/347; 455/501, 502, 522, 63.1, 67.11, 455/67.13, 226.1, 226.2, 226.3, 296; 370/317, 370/318, 320, 464, 465
See application file for complete search history.

(56) References Cited

U.S. PATENT DOCUMENTS

| | | | | |
|---|---|---|---|---|
| 6,799,044 | B1 * | 9/2004 | Wesby et al. | 455/452.1 |
| 7,190,957 | B2 * | 3/2007 | Okawa et al. | 455/436 |
| 2005/0250497 | A1 * | 11/2005 | Ghosh et al. | 455/436 |

OTHER PUBLICATIONS

TS 100 908 v6.2.0 (Jul. 1998); Digital Cellular Telecommunications System (Phase 2+); Multiplexing and Multiple Access on the Radio Path. (GSM 05.02 version 6.2.0 Release 1997).
"CCI Mitigation Using Interference Whitening in Bandlimited Micro-Cellular BPSK Systems", N. Beaulieu et al, in *Proceedings of IEEE Globecom 2004*, pp. 3083-3087, Nov. 2004.
"SNR Mismatch and Online Estimation in Turbo Decoding", T. Summers et al, *IEEE Transactions on Communications*. vol. 46, No. 4, pp. 421-423, Apr. 1998.
"Analysis of Signal-to-Interference Ratio Estimation Methods for Wireless Communication Systems", A. Sampath et al, in *Proceedings of IEEE ICC 2001*, pp. 2499-2503, Jun. 2001.

* cited by examiner

*Primary Examiner*—Dac V Ha (57) ABSTRACT

A method, mobile device, network device, system, and software are devised for soft value scaling with a single antenna interference cancellation (SAIC) receiver, or with an interference rejection combining (IRC) receiver, in an unsynchronized network. A signal is received having interference that is caused by a non-synchronized network. A desired power level of that signal is calculated. Then the desired power is compared to a total power of the signal, in order to identify a portion of a received burst having substantial interference. Then that portion of the received burst is weighted, to reduce its importance during decoding.

25 Claims, 7 Drawing Sheets

| NB= | Guard 4 | Tails 3 | Data 58 | TRS 26 | Data 58 | Tails 3 | Guard 4 |
|---|---|---|---|---|---|---|---|

| AB= | Tails 8 | TRS 41 | Data 36 | Tails 3 | Guard 68 |
|---|---|---|---|---|---|

METHOD, DEVICE, SYSTEM AND SOFTWARE PRODUCT FOR SOFT VALUE SCALING WITH RECEIVERS IN AN UNSYNCHRONIZED NETWORK

CROSS-REFERENCE TO RELATED APPLICATION

This application claims priority to U.S. Provisional Application 60/842,088 filed Sep. 1, 2006.

FIELD OF THE INVENTION

The invention relates to wireless telecommunications, and more particularly to a receiver in an unsynchronized network.

BACKGROUND OF THE INVENTION

Wireless telecommunications systems continue to evolve. Examples of such systems are GSM (Global System for Mobile Communication) and UMTS (Universal Mobile Telecommunication System). Each such wireless communication system typically includes a radio access network (RAN). In UMTS, the RAN is called UTRAN (UMTS Terretrial RAN). A UTRAN includes one or more Radio Network Controllers (RNCs), each having control of one or more Node Bs, which are wireless terminals configured to communicatively couple to one or more UE terminals. The combination of an RNC and the Node Bs it controls is called a Radio Network System (RNS). A GSM RAN includes one or more base station controllers (BSCs), each controlling one or more base transceiver stations (BTSs). The combination of a BSC and the BTSs it controls is called a base station system (BSS).

Since the turn of this century, advancements in GSM, such as advanced frequency hopping, have greatly enhanced GSM voice capacity. Despite these advances, interference control is now largely influenced by cell site placement and antenna optimization. However, a relatively recent interference mitigation technique called Single Antenna Interference Cancellation (SAIC) shows promise. Historically, the most common method of reducing the impact of interference in a wireless system has been to use multiple antennas, often referred to as receive or antenna diversity. Conceptually, diversity provides multiple "diverse views" of the signal being transmitted in the presence of interference, so that the view which best overcomes the perturbations of the radio channel and interference is preferred for the receiver. Nevertheless, when receiving signals via two antennas, the hardware and software complexity increases, and hence the implementation cost is significantly higher. Therefore, today, multiple antennas are mainly used in base stations rather than in mobile terminals.

An alternative to "receive diversity" is interference cancellation using a single antenna at the handset. For example, SAIC may include joint demodulation, or may include newer low-complexity techniques involving a "virtual second antenna" which can be used to improve the robustness of the receiver in interference limited scenarios. Generally speaking, SAIC involves the class of algorithms enabling interference cancellation without exploiting a second receive antenna.

Many of the major wireless networks are asynchronous, meaning that any given base station does not attempt to align its transmitted signals with other base stations. The most powerful SAIC methods tend to be sensitive to the amount of overlap of the interfering signals with the desired signal. Typically, the best performance is achieved when the dominant interfering signal (burst) does not change characteristics throughout the desired signal's burst. One way to ensure this is to synchronize base stations and align all bursts to a common timing source, e.g. a global positioning system (GPS) clock.

As with any potential improvement in performance on either the uplink or downlink, it should be ensured that equal or better gains can be achieved on the other link. SAIC has primarily achieved a downlink gain. It is also desirable to have improvements for interference cancellation on the uplink, where multiple receive antennas are commonly used. For example, a multiple antenna interference cancellation technique known as Interference Rejection Combining (IRC) has been shown to provide network capacity gains of up to 50% in a synchronized network. The larger computational capabilities in base stations suggests that downlink receiver improvement can be matched by uplink performance using IRC. Hence, the downlink has usually been considered to be the limiting factor in GSM.

Statistical distribution of interference defines the performance of a communications link in capacity-limited conditions, where the carrier-to-noise ratio is negligible compared to carrier-to-interference ratio. Network synchronization can guarantee good statistical distribution of interferers for SAIC/IRC receivers. The Synchronization System Solution achieves a timeslot (TS) synchronization in all cells of the network by means of a common GPS clock signal and local measurement unit (LMU), which is required in every base station. Currently, no simpler way has been implemented to synchronize the network.

In contrast, when a network is non-synchronized, time-variant interference distribution is based on several network parameters such as frequency band allocation, frequency reuse, frequency load, cell size, DTX, frequency hopping parameters, and so on. Therefore, interfering signals are randomly overlapping with the user signal, and since there are many factors contributing to the overall achievable interference-limited performance in a non-synchronized network, the effect and gain of interference cancellation may not always be visible.

SUMMARY OF THE INVENTION

Figure 2:
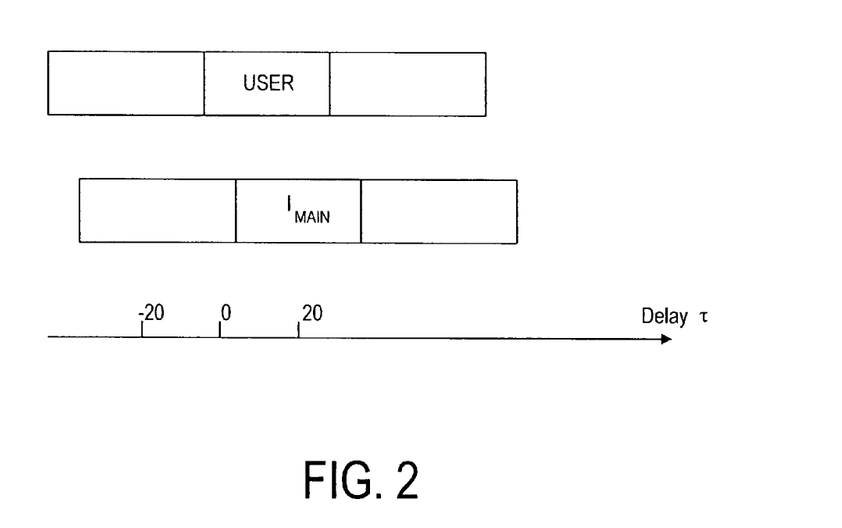
FIG. 2 presents a desired signal with synchronized interference in time domain (symbols).

With the help of synchronization, the burst-wise interference rejection performance can be improved via good quality soft values, and correct signal to noise ration (SNR) weighting between the interleaved bursts will improve the performance of the channel coding. The receiver can correct a lot of errors caused by interfering signals, thus resulting in lower frame error rate (FER) than in a non-synchronized case. FIG. 2 illustrates a synchronized case.

Figure 1:
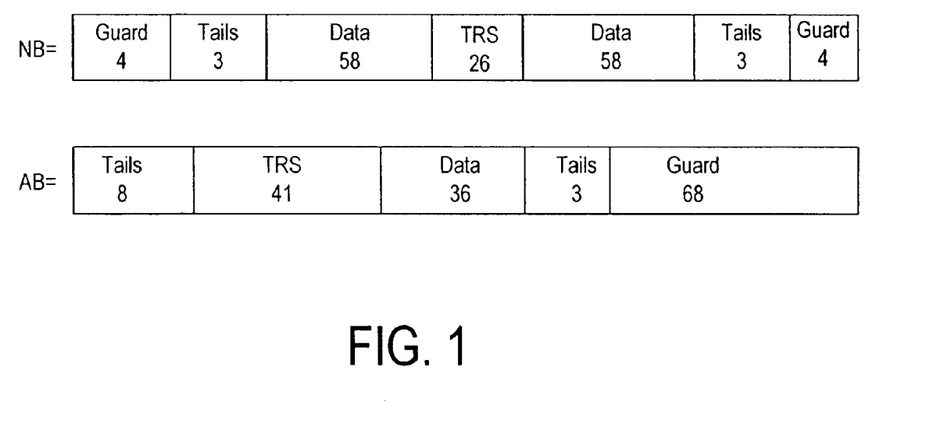
FIG. 1 shows a burst format that represents a GSM/EDGE normal burst (NB) and an access burst (AB).
Figure 3:
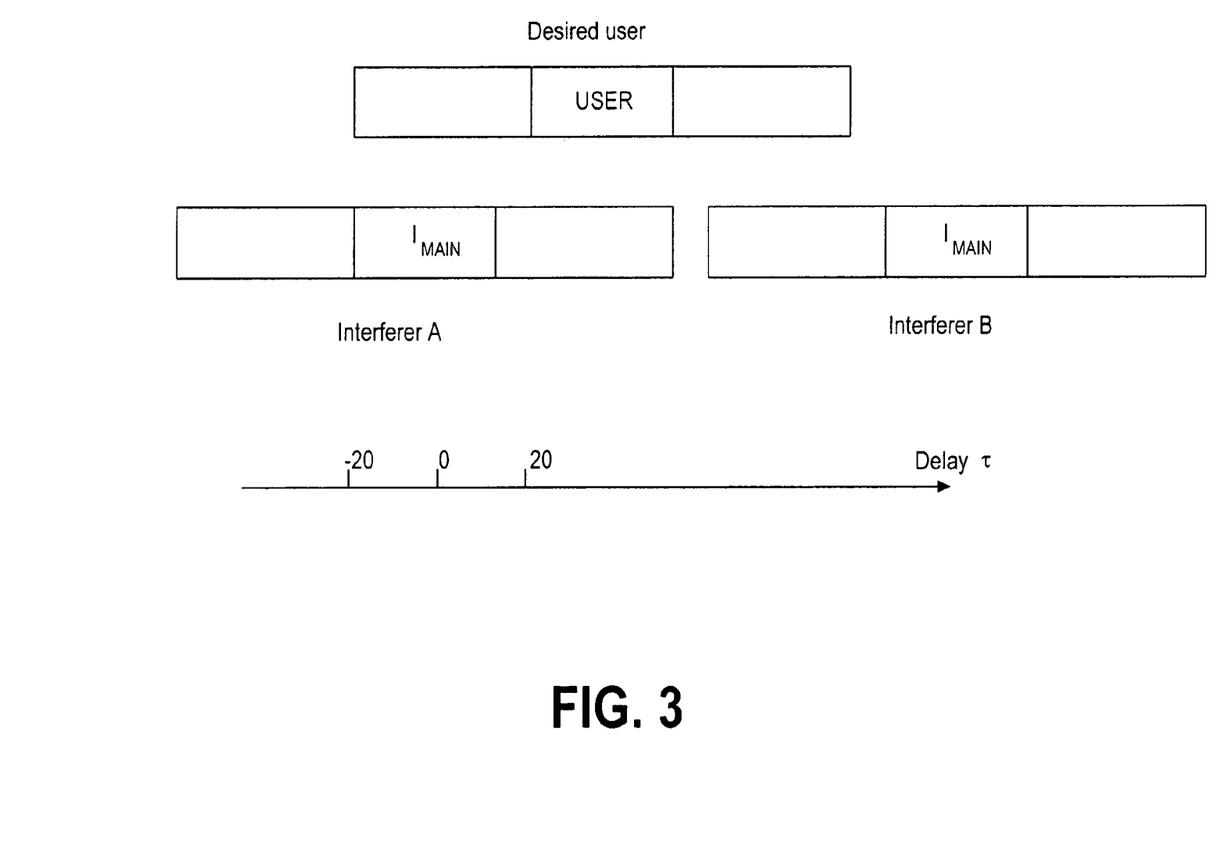
FIG. 3 presents a desired signal with two unsynchronized interfering signals in time domain (symbols). Note that receiver does not have statistical information about interferer B.

Performance depends, burst-by-burst, on the timing offset between the user and interfering signals. The worst case would be a scenario where several different interfering signals are overlapping the user's encrypted symbols (58, 58) of normal burst, but not the user training sequence symbols (26), in the burst format of FIG. 1. This subject is also addressed in "GSM 05.02: Digital cellular telecommunications system (Phase 2+); Multiplexing and multiple access on the radio path, v.6.2.0", hereby incorporated by reference. Also see FIG. 3 of the present application, showing unsynchronized multiple interferers. The delay axis in FIG. 3 represents symbol level of the timing offset between the desired user and interfering signals. In the scenario of FIG. 3, the receiver will have only partial statistical information about an interferer A, and no information at all about an interferer B.

Blind SAIC/IRC receivers are designed to operate in a synchronous network. The reason is the critical time alignment of the desired user and interfering signals. If the interfering signal is overlapping the desired signal, there is statistically good information about the interferer. This information can be used to cancel out the interfering signal of the desired signal. In an un-synchronous network, the interferer(s) is/are randomly overlapping the desired user signal. In a worst case scenario, one or more interferer(s) is/are overlapping only the data part of the time division multiple access (TDMA) burst. In this case, the information of the interferers is not available for the estimation function, and as a result the interference contribution to the signal can not be resolved, and therefore can not be removed.

High performance interference cancellation in a non-synchronized network is difficult to organize due to the network level factors and scenario described above. Since the timing between cells in not controlled, the propagation delay of the interferers is also uncontrolled.

There are also critical side effects in this problem. For example, because the SAIC/IRC method is blind, it does not make any assumptions about the interferer structure or timing. At a low network load, the link conditions are good, and a high quality speech codec can be used. When the load increases, there are more and more overlapping users, and finally link conditions are oscillating between good and bad according to interference distribution over the desired signal. The interfering radio conditions are changing burst-by-burst (for example, due to random frequency hopping). Currently, the link adaptation algorithms for the downlink and uplink cannot follow the burst-wise interferers, and thus less robust speech codecs are selected in poor radio conditions.

Figure 5:
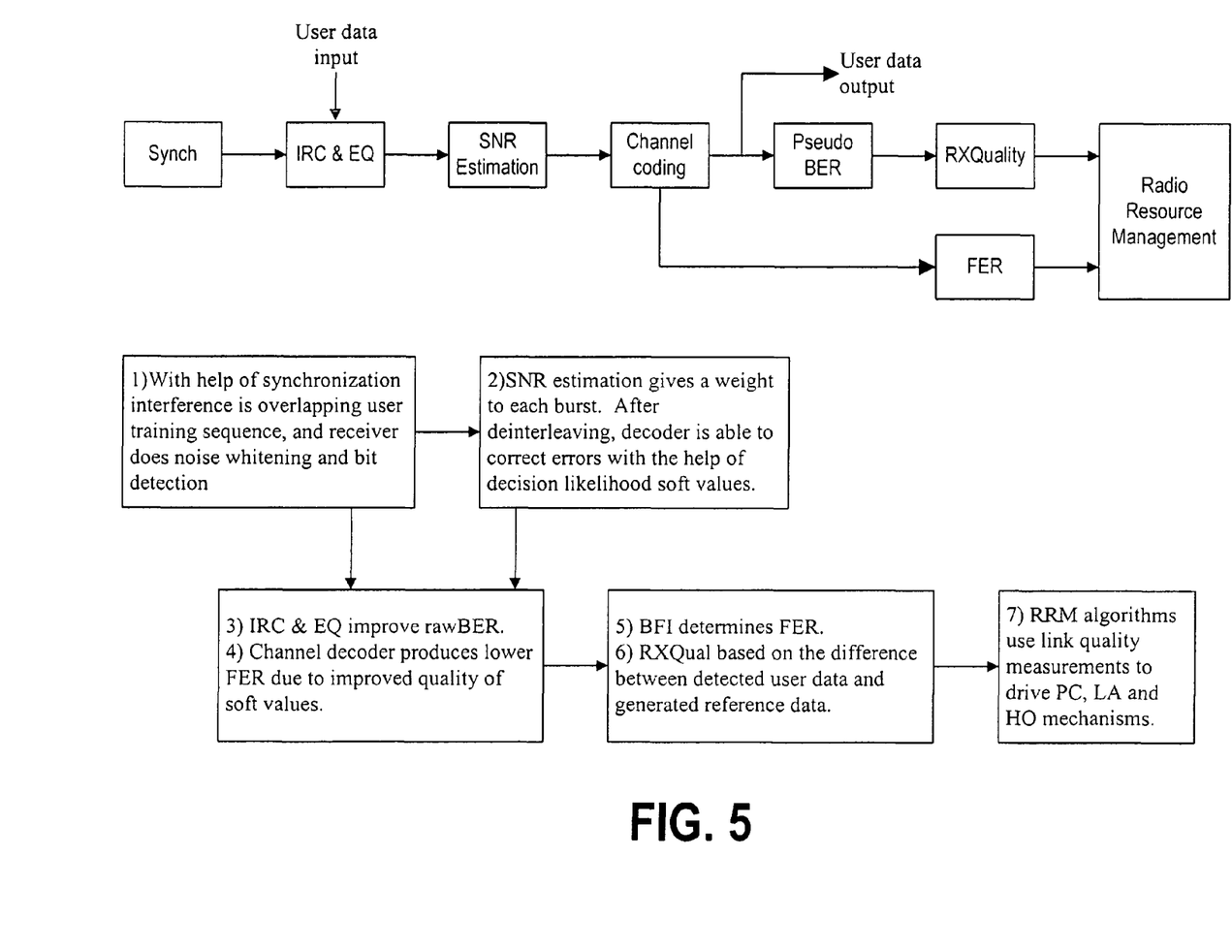
FIG. 5 presents an IRC receiver operation in a synchronized network.

IRC diversity receiver implementation has been previously designed with synchronized interferers in mind. When the network is synchronized, and cell size is relatively small, interfering signal(s) are almost completely overlapping the signal. Therefore the interfering training sequences are overlapping the user training sequence as well. This gives a nice possibility to resolve the correlation between the main and diversity signal branches, and removing the correlation. After this process, the user signal noise can be estimated to be white, and signal branches can be effectively combined using maximum ratio combining (MRC). See FIG. 5, IRC receiver operation in a synchronized network. But this still leaves the difficulty of receivers in an unsynchronized network.

The problem described above can be mitigated by introducing a burst-wise weighting function or process, which reduces the importance of the data parts, which are interfered but not correctable by SAIC/IRC. Weighting in this context means reduced importance of the interfered soft values during the decoding phase to avoid frame errors.

Of course, the "RX-Level" is the power of a signal when the signal is received. When the total RX-Level, i.e. carrier plus interference plus noise (C+I+N), is compared to the true RX-Level of a desired user, calculated either from a least square estimate (i.e. LSE impulse response estimate) of the training sequence code (TSC) before noise whitening or from the user data after the noise whitening, based on the power difference in different data portions, it is possible to identify portions from the received burst which are interfered, but which can not be corrected.

After the interfered portions have been identified, those portions need to be weighted down burst-by-burst. Furthermore, the estimation and weighting can be calculated either for each whole data portion (each of 58 symbols long data portion weighted independently) in a normal burst, or in smaller portions in order to increase the granularity of the weighting function for shorter interleaving periods.

DETAILED DESCRIPTION OF THE INVENTION

Figure 4:
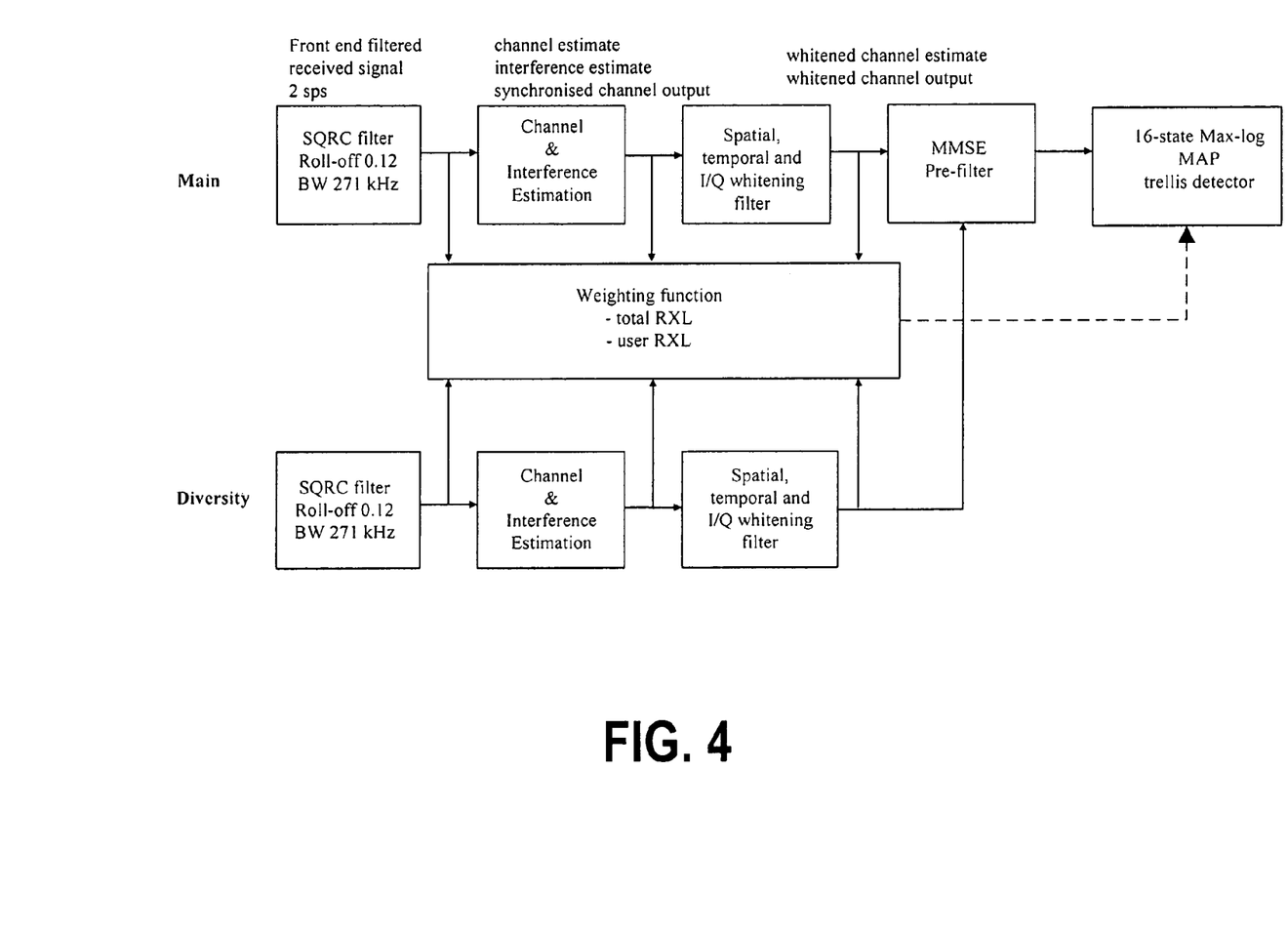
FIG. 4 shows a diversity receiver chain that represents a general receiver structure which can be used to demonstrate and implement the soft value scaling method of the present invention, either with a single antenna or with multiple antennas.

A preferred embodiment of the present invention will now be described, merely to illustrate one way of implementing the invention, and without limiting the scope or coverage of what is described elsewhere in this application. According to this embodiment of the invention, FIG. 4 presents a general structure of a SAIC (or IRC with diversity branch) receiver containing a front end filter and a pre-filter in front of the equalizer. The purpose of the front end filter is to filter the wanted channel from the rest. The pre-filter is used in case of enhanced data for GSM evolution (EDGE), in order to change the channel impulse response to minimum phase, which is needed in case of sub-optimum receivers. The sub-optimum receivers must be used to avoid extensive complexity.

The function of interference rejection is to remove colored noise as much as possible from the received signal using noise whitening. The whitening is also known as de-correlation. The whitening can be either temporal (over-sampling) or spatial (multiple antennas), or between the I- and Q-signals of a real signal using complex signal representation. When whitening is considered in time domain (de-correlation between odd and even samples) then corresponding process is known as temporal whitening. When whitening is performed in spatial domain (de-correlation between normal & diversity samples) then the corresponding operation is known to be spatial whitening. Spatial, temporal and IQ whitening can be done jointly, thus resulting so called joint Space-Time IRC (ST-IRC) and Space-Time-Complex plane IRC (STC-IRC).

The diversity receiver of FIG. 4 can be used to demonstrate and implement the proposed soft value scaling method either with single antenna, or with multiple antennas. The total received signal strength indication (RSSI) level of the timeslot is measured and compared to the desired user RSSI value of the burst. According the RSSI difference, a function can be defined, which can be used to weight the equalizer output (soft values) with a value $0 < \text{weight} \leq 1$. This can be written as follows:

$$\begin{pmatrix} Sval(1) \\ Sval(2) \\ ... \end{pmatrix} = \begin{pmatrix} f1(\text{RSSI\_total} - \text{RSSI\_user}) \\ f2(\text{RSSI\_total} - \text{RSSI\_user}) \\ ... \end{pmatrix}^T \begin{pmatrix} Sval(1) \\ Sval(2) \\ ... \end{pmatrix}$$

The expected gain comes from the channel decoding and the uncertain decisions are scaled to be more uncertain as they should be when unsynchronized interference is disturbing the equalizer decisions. Channel decoder can achieve additional 2 dB coding gain from soft decision decoding compared to hard decision decoding, but only if the soft values are representing their true likelihood. It should be noted that this method doesn't change the decisions of the equalizer, and therefore the actual bit error rate (BER) values are exactly the same as before the scaling.

According to this embodiment of the invention, a channel decoder can achieve an additional 2 dB coding gain from soft decision decoding compared to hard decision decoding, but only if the soft values are representing their true likelihood. The overall improvement could be estimated to be, for example, 3 dB or more at 10% block error rate (BLER). The equalizer soft output weighting function according to this embodiment of the invention is easy to implement and has low overall complexity. Network synchronization is not necessarily requested in order to achieve IRC gain.

The embodiment described above can be implemented using a general purpose or specific-use computer system, with standard operating system software conforming to the method described herein. The software is designed to drive the operation of the particular hardware of the system, and will be compatible with other system components and I/O controllers. The computer system of this embodiment includes the CPU processor, comprising a single processing unit, multiple processing units capable of parallel operation, or the CPU can be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, similar to the CPU, the memory may reside at a single physical location, comprising one or more types of data storage, or be distributed across a plurality of physical systems in various forms.

Several concepts included in the present invention will now be briefly described, without in any way limiting the scope of the invention.

Figure 6:
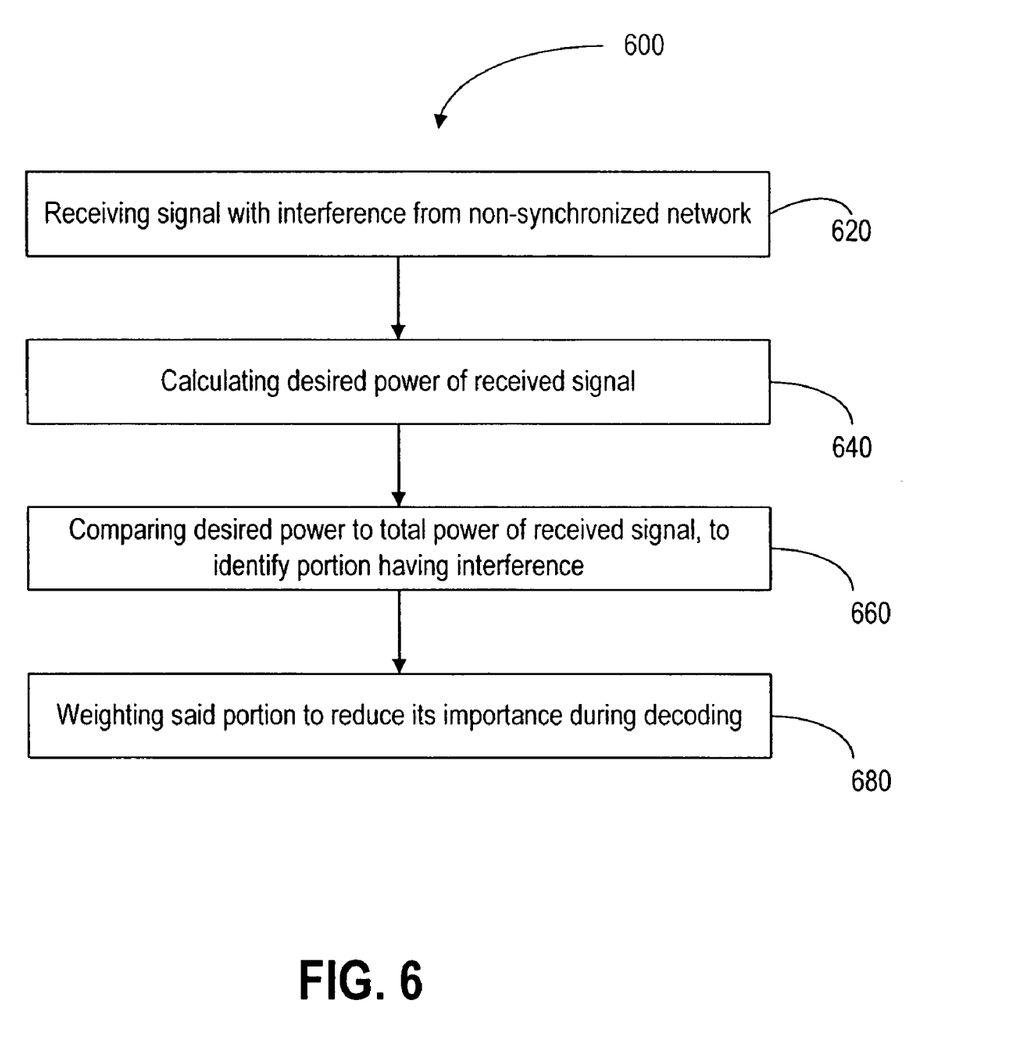
FIG. 6 is a flow chart showing a method according to an embodiment of the present invention.

The invention includes a first concept, illustrated in FIG. 6, which is a method 600 comprising: receiving 620 a signal having interference, wherein the interference is caused by a non-synchronized network; calculating 640 a desired power level of the signal; comparing 660 the desired power to a total power of the signal, in order to identify at least one portion of a received burst having substantial interference; and weighting 680 said at least one portion to reduce importance of said at least one portion during decoding.

The invention includes a second concept which is the first concept, wherein the desired power level is calculated from a least square estimate of a training sequence code before whitening, or is calculated from user data after the whitening.

The invention includes a third concept which is the first concept, wherein the total power includes power of a carrier signal, plus noise, plus interference.

The invention includes a fourth concept which is the first concept, wherein the calculating, the comparing, and the weighting are performed downstream from a front end filter and upstream from a pre-filter, wherein said pre-filter changes a channel impulse response to minimum phase, and wherein said pre-filter is upstream from an equalizer.

The invention includes a fifth concept which is the second concept, wherein the whitening is used to perform interference rejection combining.

The invention includes a sixth concept which is a device comprising: means for calculating a desired power level of a signal having interference, wherein the interference is caused by a non-synchronized network; means for comparing the desired power to a total power of the signal, in order to identify at least one portion of a received burst having substantial interference; and means for weighting said at least one portion to reduce importance of said at least one portion during decoding.

The invention includes a seventh concept which is the sixth concept, further comprising means for receiving the signal.

The invention includes an eighth concept which is the sixth concept, further comprising means for receiving the signal, further comprising means for whitening, and wherein the desired power level is calculated from a least square estimate of a training sequence code upstream from the means for whitening, or is calculated from user data downstream from the means for whitening.

The invention includes a ninth concept which is the sixth concept, further comprising means for receiving the signal, wherein the total power includes power of a carrier signal, plus noise, plus interference.

The invention includes a tenth concept which is the sixth concept, further comprising means for receiving the signal, wherein the means for calculating, the means for comparing, and the means for weighting are located downstream from a front end filter and upstream from a pre-filter, wherein said pre-filter changes a channel impulse response to minimum phase, and wherein said pre-filter is upstream from an equalizer.

The invention includes an eleventh concept which is the eighth concept, further comprising means for receiving the signal, wherein the means for whitening is used to perform interference rejection combining.

The invention includes a twelfth concept which is a device comprising: first processing module configured to calculate a desired power level of a signal having interference, wherein the interference is caused by a non-synchronized network; second processing module configured to compare the desired power to a total power of the signal, in order to identify at least one portion of a received burst having substantial interference; and weighting module configured to weight said at least one portion to reduce importance of said at least one portion during decoding.

The invention includes a thirteenth concept which is the twelfth concept, further comprising means for receiving the signal, further comprising at least one antenna configured to receive the signal having interference.

The invention includes a fourteenth concept which is the twelfth concept, further comprising a whitening module, and wherein the desired power level is calculated from a least square estimate of a training sequence code upstream from the whitening module, or is calculated from user data downstream from the whitening module.

The invention includes a fifteenth concept which is the twelfth concept, wherein the total power includes power of a carrier signal, plus noise, plus interference.

The invention includes a sixteenth concept which is the twelfth concept, wherein the first processing module and the second processing module and the weighting module are located downstream from a front end filter and upstream from a pre-filter, wherein said pre-filter changes a channel impulse response to minimum phase, and wherein said pre-filter is upstream from an equalizer.

The invention includes a seventeenth concept which is the fourteenth concept, wherein the whitening module is configured to perform interference rejection combining.

The invention includes an eighteenth concept which is a software product comprising a computer readable medium having executable codes embedded therein; the codes, when executed, adapted to carry out the functions of: receiving a signal having interference, wherein the interference is caused by a non-synchronized network; calculating a desired power level of the signal; comparing the desired power to a total power of the signal, in order to identify at least one portion of a received burst having substantial interference; and weighting said at least one portion to reduce importance of said at least one portion during decoding.

The invention includes a nineteenth concept which is the eighteenth concept, wherein the desired power level is calculated from a least square estimate of a training sequence code before whitening, or is calculated from user data after the whitening.

The invention includes a twentieth concept which is the eighteenth concept, wherein the total power includes power of a carrier signal, plus noise, plus interference.

The invention includes a twenty-first concept which is the eighteenth concept, wherein the calculating, the comparing, and the weighting are performed downstream from a front end filter and upstream from a pre-filter, wherein said pre-filter changes a channel impulse response to minimum phase, and wherein said pre-filter is upstream from an equalizer.

The invention includes a twenty-second concept which is the nineteenth concept, wherein the whitening is used to perform interference rejection combining.

The invention includes a twenty-third concept which is the sixth concept, wherein the device is a mobile terminal, and wherein the device further comprises other components for wireless communication.

The invention includes a twenty-fourth concept which is the twelfth concept, wherein the device is a mobile terminal, and wherein the device further comprises other components for wireless communication.

The invention includes a twenty-fifth concept which is the sixth concept, wherein the device is a network element at a base station.

The invention includes a twenty-sixth concept which is the twelfth concept, wherein the device is a network element at a base station.

The invention includes a twenty-seventh concept which is a system comprising: at least one antenna configured to receive a signal having interference, wherein the interference is caused by a non-synchronized network; first processing module configured to calculate a desired power level of the signal; second processing module configured to compare the desired power to a total power of the signal, in order to identify at least one portion of a received burst having substantial interference; and weighting module configured to weight said at least one portion to reduce importance of said at least one portion during decoding.

The invention includes a twenty-eighth concept which is the twenty-seventh concept, further comprising a whitening module, and wherein the desired power level is calculated from a least square estimate of a training sequence code upstream from the whitening module, or is calculated from user data downstream from the whitening module.

Figure 7:
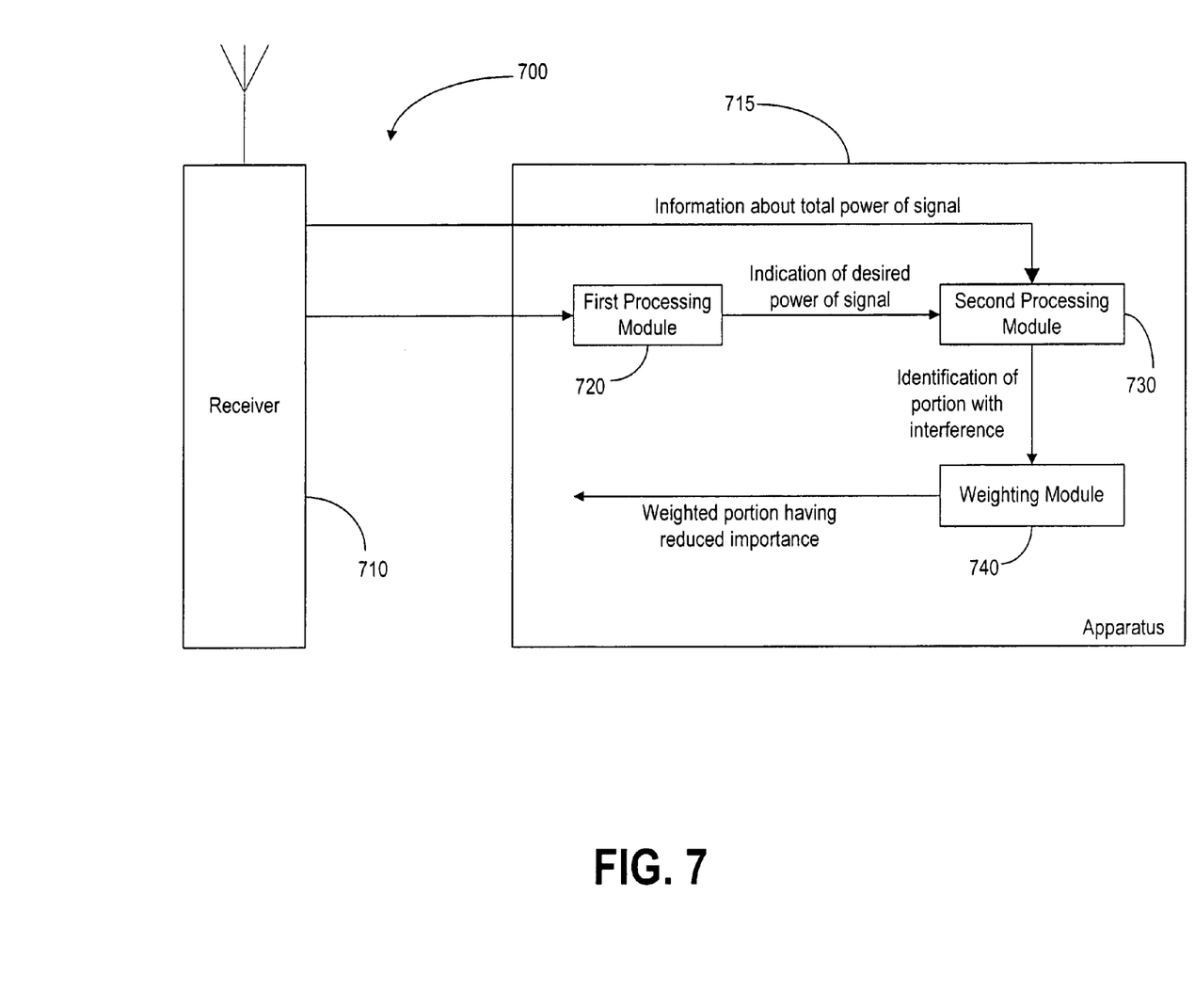
FIG. 7 shows a system according to an embodiment of the present invention.

An embodiment of the present invention can be seen in the system 700 shown in FIG. 7. A receiver 710 receives a signal, and information about the signal is provided to an apparatus 715 which includes a first processing module 720. The first processing module 720 indicates a desired power of the signal to a second processing module 730, which compares that desired power to the total power of the signal. The second processing module 730 then identifies a portion of the received signal having substantial interference, and a weighting module 740 weights the signal so that the portion having the interference will have less importance in the decoding process.

It is to be understood that the present figures, and the accompanying narrative discussions of best mode embodiments, do not purport to be completely rigorous treatments of the method, system, mobile device, and software product under consideration. A person skilled in the art will understand that the steps and signals of the present application represent general cause-and-effect relationships that do not exclude intermediate interactions of various types, and will further understand that the various steps and structures described in this application can be implemented by a variety of different sequences and configurations, using various different combinations of hardware and software which need not be further detailed herein.

What is claimed is:

1. A method comprising:
   receiving a signal having interference, wherein the interference is caused by a non-synchronized network;
   calculating a desired power level of the signal;
   comparing the desired power to a total power of the signal, in order to identify at least one portion of a received burst having substantial interference; and
   weighting said at least one portion to reduce importance of said at least one portion during decoding.

2. The method of claim 1, wherein the desired power level is calculated from a least square estimate of a training sequence code before whitening, or is calculated from user data after the whitening.

3. The method of claim 2, wherein the whitening is used to perform interference rejection combining.

4. The method of claim 1, wherein the total power includes power of a carrier signal, plus noise, plus interference.

5. The method of claim 1, wherein the calculating, the comparing, and the weighting are performed downstream from a front end filter and upstream from a pre-filter, wherein said pre-filter changes a channel impulse response to minimum phase, and wherein said pre-filter is upstream from an equalizer.

6. An apparatus comprising:
   means for calculating a desired power level of a signal having interference, wherein the interference is caused by a non-synchronized network;
   means for comparing the desired power to a total power of the signal, in order to identify at least one portion of a received burst having substantial interference; and
   means for weighting said at least one portion to reduce importance of said at least one portion during decoding.

7. The apparatus of claim 6, further comprising means for receiving the signal.

8. The apparatus of claim 6, further comprising means for receiving the signal, further comprising means for whitening, and wherein the desired power level is calculated from a least square estimate of a training sequence code upstream from the means for whitening, or is calculated from user data downstream from the means for whitening.

9. The apparatus of claim 8, further comprising means for receiving the signal, wherein the means for whitening is used to perform interference rejection combining.

10. The apparatus of claim 6, further comprising means for receiving the signal, wherein the total power includes power of a carrier signal, plus noise, plus interference.

11. The apparatus of claim 6, further comprising means for receiving the signal, wherein the means for calculating, the means for comparing, and the means for weighting are located downstream from a front end filter and upstream from a pre-filter, wherein said pre-filter changes a channel impulse response to minimum phase, and wherein said pre-filter is upstream from an equalizer.

12. The apparatus of claim 6, wherein the apparatus is a network element at a base station, or is a mobile terminal further comprising other components for wireless communication.

13. An apparatus comprising:
at least one processor; and
at least one memory including executable codes, the at least one memory and the executable codes configured to, with the at least one processor, cause the apparatus at least to:
calculate a desired power level of a signal having interference, wherein the interference is caused by a non-synchronized network;
compare the desired power to a total power of the signal, in order to identify at least one portion of a received burst having substantial interference; and
weight said at least one portion to reduce importance of said at least one portion during decoding.

14. The apparatus of claim 13, the at least one memory and the executable codes configured to, with the at least one processor, cause the apparatus to receive the signal having interference.

15. The apparatus of claim 13, the at least one memory and the executable codes configured to, with the at least one processor, cause the apparatus to calculate the desired power level from a least square estimate of a training sequence code.

16. The apparatus of claim 15, wherein the whitening module is configured to perform interference rejection combining.

17. The apparatus of claim 13, wherein the total power includes power of a carrier signal, plus noise, plus interference.

18. The apparatus of claim 13, the at least one memory and the executable codes configured to, with the at least one processor, cause the apparatus to change a channel impulse response to a minimum phase.

19. A non-transitory computer readable medium having executable codes embedded therein; the codes, when executed by a processor, cause an apparatus at least to perform:
receive a signal having interference, wherein the interference is caused by a non-synchronized network; calculating a desired power level of the signal;
compare the desired power to a total power of the signal, in order to identify at least one portion of a received burst having substantial interference; and
weight said at least one portion to reduce importance of said at least one portion during decoding.

20. The non-transitory computer readable medium of claim 19, configured to, with the processor, cause the apparatus to calculate the desired power level from a least square estimate of a training sequence code before whitening, or from user data after the whitening.

21. The non-transitory computer readable medium of claim 20, wherein the whitening is used to perform interference rejection combining.

22. The non-transitory computer readable medium of claim 19, wherein the total power includes power of a carrier signal, plus noise, plus interference.

23. The non-transitory computer readable medium of claim 19, configured to, with the processor, cause the apparatus to change a channel impulse response to minimum phase.

24. A system comprising: at least one antenna configured to receive a signal having interference, wherein the interference is caused by a non-synchronized network; first processing module configured to calculate a desired power level of the signal; second processing module configured to compare the desired power to a total power of the signal, in order to identify at least one portion of a received burst having substantial interference; and weighting module configured to weight said at least one portion to reduce importance of said at least one portion during decoding.

25. The system of claim 24, further comprising a whitening module, and wherein the desired power level is calculated from a least square estimate of a training sequence code upstream from the whitening module, or is calculated from user data downstream from the whitening module.

* * * * *